(12) United States Patent
Imielinski et al.

(10) Patent No.: US 8,756,245 B2
(45) Date of Patent: Jun. 17, 2014

(54) SYSTEMS AND METHODS FOR ANSWERING USER QUESTIONS

(75) Inventors: Tomasz Imielinski, Princeton, NJ (US);
Rohit Mittal, Edison, NJ (US); Scot Zola, Scottsdale, AZ (US); Jay Kumar Goyal, Edison, NJ (US)

(73) Assignee: IAC Search & Media, Inc., Oakland, CA (US)

( * ) Notice: Subject to any disclaimer, the term of this patent is extended or adjusted under 35 U.S.C. 154(b) by 951 days.

(21) Appl. No.: 11/435,461

(22) Filed: May 16, 2006

(65) Prior Publication Data

US 2007/0022109 A1   Jan. 25, 2007

Related U.S. Application Data

(60) Provisional application No. 60/702,524, filed on Jul. 25, 2005.

(51) Int. Cl.
*G06F 7/00* (2006.01)
*G06F 17/30* (2006.01)

(52) U.S. Cl.
CPC ................ *G06F 17/30684* (2013.01)
USPC .............................................. 707/769; 704/9

(58) Field of Classification Search
None
See application file for complete search history.

(56) References Cited

U.S. PATENT DOCUMENTS

| 5,519,608 | A | * | 5/1996 | Kupiec ............................. 704/9 |
| 5,884,302 | A | * | 3/1999 | Ho ..................................... 1/1 |
| 5,895,466 | A | * | 4/1999 | Goldberg et al. ................. 1/1 |
| 5,933,822 | A | * | 8/1999 | Braden-Harder et al. ........ 1/1 |
| 6,028,601 | A | * | 2/2000 | Machiraju et al. ......... 715/705 |
| 6,584,464 | B1 | * | 6/2003 | Warthen ............................ 1/1 |
| 6,665,666 | B1 | * | 12/2003 | Brown et al. .................... 1/1 |
| 7,058,564 | B2 | * | 6/2006 | Ejerhed ......................... 704/1 |
| 2005/0080625 | A1 | * | 4/2005 | Bennett et al. .............. 704/249 |

OTHER PUBLICATIONS

PCT International Search Report and Written Opinion for International Application No. PCT/US06/38341, mailed Sep. 25, 2007, 13 pages.

* cited by examiner

*Primary Examiner* — Fred I Ehichioya
*Assistant Examiner* — Hasanul Mobin
(74) *Attorney, Agent, or Firm* — Stephen M. De Klerk

(57) ABSTRACT

Systems and methods for answering user questions using databases annotated with answerable questions are disclosed. The database includes database items organized into columns. Each of the columns may have a question annotated thereto. The question is a parameterized question that is answerable by the database items in the column. A question answering algorithm is used to search the database for an annotated question corresponding to a question that needs to be answered.

29 Claims, 9 Drawing Sheets

| Academy Award for Best Actress (AWARD TIME ACTRESS MOVIE) | | |
|---|---|---|
| TIME | ACTRESS | MOVIE |
| 1929/28 | Janet Gaynor | 7th Heaven |
| 1930/29 | Mary Pickford | Coquette |
| 1931/30 | Norma Shearer | The Divorcee |
| 1932/31 | Marie Dressler | Min and Bill |
| 1933/32 | Helen Hayes | The Sin of Madelon Claudet |
| 1934/33 | Katherine Hepburn | Morning Glory |
| 1935 | Claudette Colbert | It Happened One Night |
| 1936 | Bette Davis | Dangerous |
| 1937 | Louise Rainer | The Great Ziegfeld |
| 1938 | Louise Rainer | The Good Earth |
| 1939 | Bette Davis | Jezebel |
| 1940 | Vivien Leigh | Gone with the Wind |
| 1941 | Ginger Rogers | Kitty Foyle |
| 1942 | Joan Fontaine | Suspicion |
| 1943 | Greer Garson | Mrs. Miniver |
| 1944 | Jennifer Jones | The Song of Bernadette |
| 1945 | Ingrid Bergman | Gaslight |
| 1946 | Joan Crawford | Mildred Pierce |
| 1947 | Olivia de Havilland | To Each His Own |
| 1948 | Loretta Young | The Farmer's Daughter |
| 1949 | Jane Wyman | Johnny Belinda |
| 1950 | Olivia de Havilland | The Heiress |
| 1951 | Judy Holliday | Born Yesterday |
| 1952 | Vivien Leigh | A Streetcar Named Desire |
| 1953 | Shirley Booth | Come Back, Little Sheba |
| 1954 | Audrey Hepburn | Roman Holiday |
| 1956 | Grace Kelly | The Country Girl |
| 1956 | Anna Magnani | The Rose Tattoo |
| 1957 | Ingrid Bergman | Anastasia |
| 1958 | Joanne Woodward | The Three Faces of Eve |
| 1959 | Susan Hayward | I Want To Live |
| 1960 | Simone Signoret | Room at the Top |
| 1961 | Elizabeth Taylor | Butterfield 8 |
| 1962 | Sophia Loren | Two Women |
| 1963 | Anne Bancroft | The Miracle Worker |
| 1964 | Patricia Neal | Hud |
| 1965 | Julie Andrews | Mary Poppins |
| 1966 | Julie Christie | Darling |
| 1967 | Elizabeth Taylor | Who's Afraid of Virginia Woolf? |
| 1968 | Katherine Hepburn | Guess Who's Coming to Dinner? |
| 1969 | Barbara Streisand | The Lion in Winter |
| 1969 | Katherine Hepburn | The Lion in Winter |
| 1970 | Maggie Smith | The Prime of Miss Jean Brodie |
| 1971 | Glenda Jackson | Women in Love |
| 1972 | Jane Fonda | Klute |
| 1973 | Liza Minnelli | Cabaret |
| 1974 | Glenda Jackson | A touch of Class |
| 1975 | Ellen Burstyn | Alice Doesn't Live Here Anymore |

FIG. 4A

| | | | |
|---|---|---|---|
| 1976 | Louise Fletcher | One Flew Over the Cuckoo's Nest | ← 72 |
| 1977 | Faye Dunaway | Network | |
| 1978 | Diane Keaton | Annie Hall | |
| 1979 | Jane Fonda | Coming Home | |
| 1980 | Sally Field | Norma Rae | |
| 1981 | Sissy Spacek | Coal Miner's Daughter | |
| 1982 | Katherine Hepburn | On Golden Pond | |
| 1983 | Meryl Streep | Sophie's Choice | |
| 1984 | Shirley MacLaine | Terms of Endearment | |
| 1985 | Sally Field | Places in the Heart | |
| 1986 | Geraldine Page | The Trip to Bountiful | |
| 1987 | Marlee Matlin | Children of a Lesser God | |
| 1988 | Cher | Moonstruck | |
| 1989 | Jodie Foster | The Accused | |
| 1990 | Jessica Tandy | Driving Miss Daisy | |
| 1991 | Kathy Bates | Misery | |
| 1992 | Jodie Foster | The Silence of the Lambs | |
| 1993 | Emma Thompson | Howards End | |
| 1994 | Holly Hunter | The Piano | |
| 1995 | Jessica Lange | Blue Sky | |
| 1996 | Susan Sarandon | Dead Man Walking | |
| 1997 | Frances McDormand | Fargo | |
| 1998 | Helen Hunt | As Good As It Gets | |
| 1999 | Gwyneth Paltrow | Shakespeare in Love | |
| 2000 | Hilary Swank | Boys Don't Cry | |
| 2001 | Julia Roberts | Erin Brockvich | |
| 2002 | Halle Berry | Monster's Ball | |
| 2003 | Nicole Kidman | The Hours | ← 76 |
| 2004 | Charlize Theron | Monster | ← 76 |
| 2005 | Hilary Swank | Million Dollar Baby | |
| When did ACTRESS win AWARD for MOVIE? When did ACTRESS in AWARD? In what year did ACTRESS win AWARD? | Who won AWARD in TIME? In TIME, which ACTRESS won AWARD? | In what MOVIE did ACTRESS win AWARD? For which MOVIE did ACTRESS win AWARD? | ← 76 |
| ACTRESS won AWARD in TIME ACTRESS won AWARD for MOVIE in TIME | ACTRESS won AWARD in TIME ACTRESS won AWARD for MOVIE in TIME | ACTRESS won AWARD for MOVIE ACTRESS won AWARD for MOVIE in TIME | ← 76 |

FIG. 4B

SYSTEMS AND METHODS FOR ANSWERING USER QUESTIONS

CROSS-REFERENCE TO RELATED APPLICATIONS

This application claims priority from U.S. Provisional Patent Application No. 60/702,524 filed on Jul. 25, 2005, which is incorporated herein by reference in its entirety.

FIELD OF THE INVENTION

This invention relates to the field of search engines and, in particular, to systems and methods for answering user questions with databases annotated with answerable questions.

BACKGROUND OF THE INVENTION

The Internet is a global network of computer systems and websites. These computer systems include a variety of documents, files, databases, and the like, which include information covering a variety of topics. It can be difficult for users of the Internet to locate this information on the Internet.

Search engines are used by most people to locate this information on the Internet. Users also often use search engines to answer simple questions. Thus, search engines also desire to provide a service which provides answers to these simple questions.

Currently, in order to determine the content of the search query, the queries are parsed to extract the relevant terms in the query. However, current techniques for answering simple questions and locating information are web-based and not reliable. Often, answers which are not relevant to the question asked or search query are returned due to current search and answering techniques. It is also difficult for users to know which questions or search queries can be answered by the search engine.

SUMMARY OF THE INVENTION

A method for natural language searching is disclosed herein. The method includes receiving a search query in the form of a natural language question; normalizing the search query; searching a database having a plurality of database items and questions tagged to the database associated with the database items for a question that matches the normalized search query; and providing an answer corresponding to the database item and question that matches the normalized search query.

The database items may be arranged into a plurality of columns and each of the columns has a question tagged to the column. The question tagged to the column may be a question answerable by the database items in the column. The question may be a parameterized question.

The search query and the tagged question may be exact matches.

The tagged question may have the answer associated therewith. The method may further include providing the answer to the search query. The answer may be a parameterized answer, and at least one database item may be substituted into the parameterized answer.

The method may further include normalizing the search query, which comprises one or more selected from the group consisting of removing unnecessary words from the search query, rephrasing the question into an answerable question, identifying and replacing words with synonyms, and modifying pluralities into singularities.

The search query may be matched to the tagged question by: automatically extracting features from the search query; identifying a database to be searched from the features; and identifying a column with a tagged question from the features.

The search query may be matched to the tagged question by: automatically extracting features from the search query; mapping at least one of the features to a concept corresponding to the database; and mapping the question that needs to be answered to a matching tagged question.

The method may further include identifying a database to search. Identifying a database to search may comprise comparing concepts extracted from the search query with concepts related to the database items in the database.

A natural language search system is also disclosed herein. The natural language search system includes a search engine to receive a search query in the form of a natural language question; a database to store a plurality of database items organized into columns and a question annotated to each of the columns, the question being a parameterized question that is answerable by the database items in the column; and a server to search the database for a question that matches the search query and provide an answer corresponding to the database item and parameterized question to the search engine.

The answer may be a parameterized answer, and the server may substitute database items corresponding to the answer to the search query into the parameterized answer before the answer is provided to the search engine.

The server may further normalize the search query. The server may further identify a database to search. The search query and annotated question may be an exact match.

A question answering system is also disclosed herein. The question answering system includes a database having a plurality of database items organized into columns, each of the columns having a question annotated thereto, the question being a parameterized question that is answerable by the database items in the column; a question answering interface, in communication with the database, the question answering interface having a question answering algorithm that searches the database for an annotated question corresponding to a question that needs to be answered.

The annotated question and the question that needs to be answered may be an exact match.

The parameterized question may have an answer associated therewith, and the question answering interface may use the answer associated with the parameterized question to answer the question that needs to be answered.

The question answering algorithm may automatically extract features from the question that needs to be answered, extract a table name from the features, and extract a parameterized question from the features.

The question answering algorithm may automatically extract features from the search query, map at least one of the features to a concept corresponding to the database; and map the question that needs to be answered to a matching tagged question.

A machine-readable medium that provides executable instructions which, when executed by a processor, cause the processor to perform a method for natural language searching is also disclosed herein. The method includes receiving a search query in the form of a natural language question; normalizing the search query; searching a database having a plurality of database items and questions tagged to the database associated with the database items for a question that matches the normalized search query; and providing an answer corresponding to the database item and question that matches the normalized search query.

A database for answering questions is also disclosed herein. The database includes a plurality of database items organized into columns; a plurality of questions, each of the plurality of questions annotated to a column, each of the questions being a parameterized question that is answerable by the database items in the column; and a plurality of answers, each of the answers annotated to one of the plurality of questions, each of the answers being a parameterized answer that corresponds to the parameterized question, wherein at least one parameter in the parameterized answer is replaceable by at least one of the database items.

At least one parameter may be replaceable by at least one of the database items in the column to which the parameterized answer is annotated.

The parameterized answer may include a plurality of parameters, each of the parameters replaceable by a database item.

A method for natural language searching is also disclosed herein. The method includes receiving a search query in the form of a natural language question; identifying a database that can provide an answer to the search query, the database having a plurality of database items organized according to database concepts; searching the database for a database item that can answer the search query; and providing an answer corresponding to the database item that answers search query.

The method may also include identifying search query concepts of the search query and matching the search query concepts with the database concepts.

Matching the search query concepts with the database concepts may include partially matching the search query concepts with the database concepts.

Statistical methods may be used to provide the answer.

String distance methods may be used to provide the answer.

The database may not include question tags or answer tags.

BRIEF DESCRIPTION OF THE DRAWINGS

The invention is described by way of example with reference to the accompanying drawings, wherein:

FIG. 4 is a schematic view of an exemplary table created according to the methods of FIGS. 2 and 3 in accordance with one embodiment of the invention;

DETAILED DESCRIPTION

Figure 1:
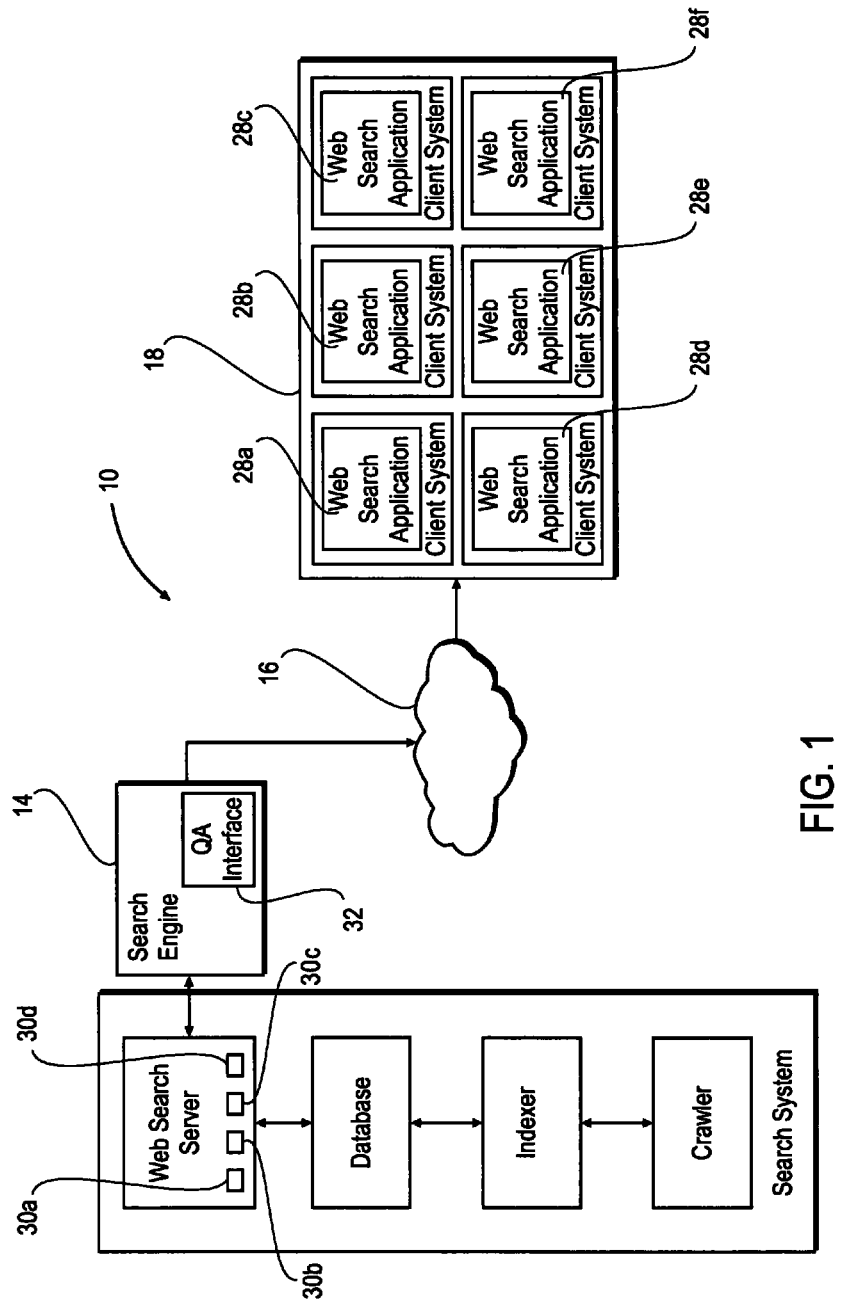
FIG. 1 is a block diagram illustrating a system for natural language service searching in accordance with one embodiment of the invention.

FIG. 1, of the accompanying drawings, shows a network system 10 which can be used in accordance with one embodiment of the present invention. The network system 10 includes a search system 12, a search engine 14, a network 16, and a plurality of client systems 18. The search system 12 includes a server 20, a database 22, an indexer 24, and a crawler 26. The plurality of client systems 18 includes a plurality of web search applications 28*a-f*, located on each of the plurality of client systems 18. The server 20 includes a plurality of databases 30*a-d*. The search engine 14 may include a question answering interface 32.

The server 12 is connected to the search engine 14. The search engine 14 is connected to the plurality of client systems 18 via the network 16. The server 20 is in communication with the database 22 which is in communication with the indexer 24. The indexer 24 is in communication with the crawler 26. The crawler 26 is capable of communicating with the plurality of client systems 18 via the network 16 as well.

The web search server 20 is typically a computer system, and may be an HTTP server. It is envisioned that the search engine 14 may be located at the web search server 20. The web search server 20 typically includes at least processing logic and memory.

The indexer 24 is typically a software program which is used to create an index, which is then stored in storage media. The index is typically a table of alphanumeric terms with a corresponding list of the related documents or the location of the related documents (e.g., a pointer). An exemplary pointer is a Uniform Resource Locator (URL). The indexer 24 may build a hash table, in which a numerical value is attached to each of the terms. The database 22 is stored in a storage media, which typically includes the documents which are indexed by the indexer 24. The index may be included in the same storage media as the database 22 or in a different storage media. The storage media may be volatile or non-volatile memory that includes, for example, read only memory (ROM), random access memory (RAM), magnetic disk storage media, optical storage media, flash memory devices and zip drives.

The crawler 26 is a software program or software robot, which is typically used to build lists of the information found on Web sites. Another common term for the crawler 26 is a spider. The crawler 26 typically searches Web sites on the Internet and keeps track of the information located in its search and the location of the information.

The network 16 is a local area network (LAN), wide area network (WAN), a telephone network, such as the Public Switched Telephone Network (PSTN), an intranet, the Internet, or combinations thereof.

The plurality of client systems 18 may be mainframes, minicomputers, personal computers, laptops, personal digital assistants (PDA), cell phones, and the like. The plurality of client systems 18 are characterized in that they are capable of being connected to the network 16. Web sites may also be located on the client systems 18. The web search application 28*a-f* is typically an Internet browser or other software.

The databases 30*a-d* are stored in storage media located at the server 20, which include structured data, as will be discussed hereinafter. The storage media may be volatile or non-volatile memory that includes, for example, read only memory (ROM), random access memory (RAM), magnetic disk storage media, optical storage media, flash memory devices and zip drives.

In use, the crawler 26 crawls websites, such as the websites of the plurality of client systems 18, to locate information on the web. The crawler 26 employs software robots to build lists of the information. The crawler 26 may include one or more crawlers to search the web. The crawler 26 typically extracts the information and stores it in the database 22. The indexer 24 creates an index of the information stored in the database 22. Alternatively, if a database 22 is not used, the indexer 24 creates an index of the information and where the information is located in the Internet (typically a URL).

When a user of one of the plurality of client systems 18 enters a search on the web search application 28, the search is communicated to the search engine 14 over the network 16. The search engine 14 communicates the search to the server 20 at the search system 12. The server 20 accesses the index and/or database to provide a search result, which is communicated to the user via the search engine 14 and network 16.

Alternatively or in addition to accessing the index and/or database to provide the search result, the databases 30a-d can be searched, as will be described hereinafter. The user may enter a question answerable by the databases 30a-d into the question answering interface 32.

Figure 2:
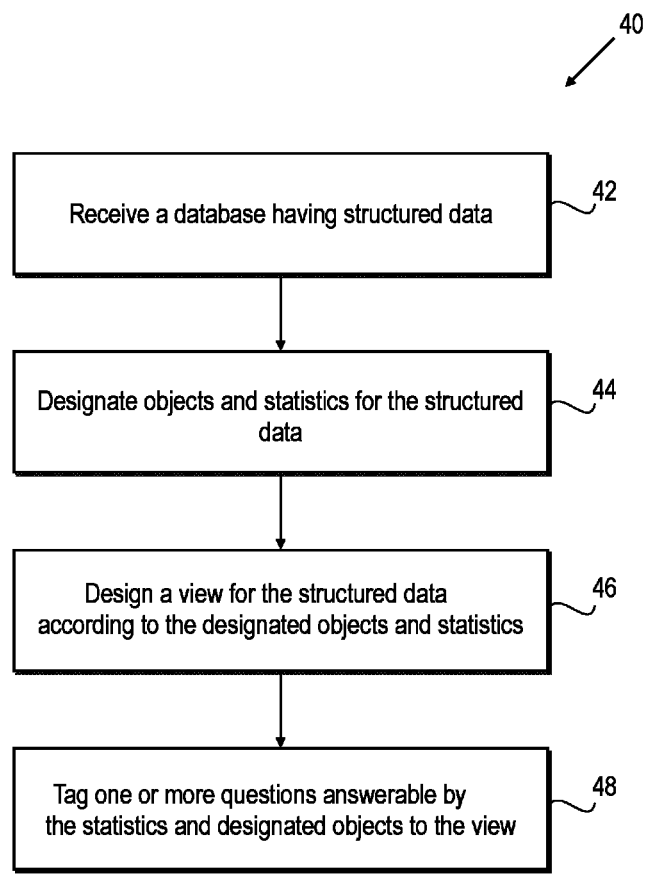
FIG. 2 is a process flow diagram showing a method for making a table for a natural language search system in accordance with one embodiment of the invention.

FIG. 2 illustrates a method for creating a database for answering search queries 40. In one embodiment, the database is one of databases 30a-e stored at the server 20 in network system 10 (FIG. 1).

At block 42, a database having structured data is received. At block 44, objects and statistics are generated for the structured data. At block 46, a view is designated for the structured data according to the designated concepts.

At block 48, questions that are answerable by the concepts may be annotated to the designed view. It will be appreciated that the question may be tagged and the question can also be referred to as a tag.

The annotated question may be a parameterized question. That is, the question may include variables, which are replaceable by actual values or database items corresponding to the designated concepts.

For example, given a database for cars, which stores information for each car including, for example: CAR (i.e., the complete name of the model, STAT (e.g., horsepower, EPA (Environmental Protection Agency's Air Pollution Score), wheelbase, legroom, MPG (miles per gallon)), TYPE (e.g., sedan, sport, SUV (sport utility vehicle)), VAL (e.g., the actual value of horsepower, EPA, wheelbase, legroom, MPG), MADE (i.e., location manufactured). Thus, the database includes the following information: Car-Properties [CAR, STAT, TYPE, VAL, MADE].

The structured data which is received at block 44 does not include the objects (e.g., CAR, STAT, TYPE, VAL, MADE). The view is created by organizing the data according to the objects in columns, wherein the data corresponding to each column is listed according to the objects. The view may be a derived table. Given the structured data, the data may be analyzed and organized as desired. For example, the cars can then be ranked based on their statistics (i.e., data) to create a new derived table. The new derived table is organized according to the designated objects (e.g., CAR, RANK, STAT, etc.). Each view is a materialization of a Structured Query Language (SQL) query or an SQL query embedded in the host program.

A question may be annotated at the bottom of a column. Given the above exemplary database for cars, the following exemplary parameterized questions can be answered by the database and are therefore annotated to the columns: What is STAT of CAR; what is MADE of CAR, which CAR has TYPE, etc. "What is STAT of CAR" is annotated to the STAT column, "What is MADE of CAR" is annotated to the MADE column, and so on.

It will be appreciated that the database need not include questions annotated thereto. In this case, as will be described hereinafter, questions may be answered using the designated concepts.

Figure 3:
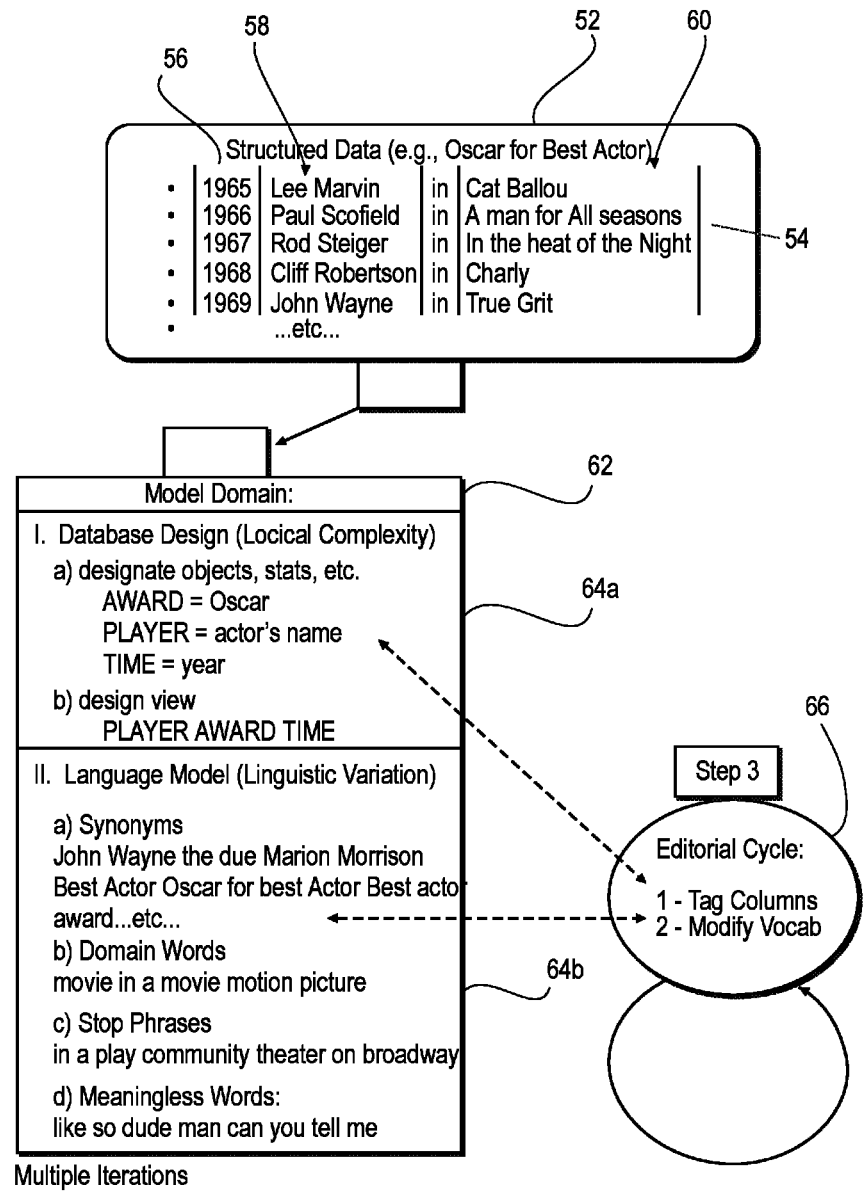
FIG. 3 is a process flow diagram showing a detailed method for making a table for a natural language search system in accordance with one embodiment of the invention.

FIG. 3 illustrates a method for creating a database for answering search queries 50 in more detail. The illustrated method is described with reference to an exemplary database directed to the Oscar for Best Actor.

At block 52, structured data is received. The data is organized into columns 52, 54 and 56. It will be appreciated that either the received data will already be organized into columns or the received data may be subsequently organized into columns. Column 52 includes data for the year the Oscar was won, column 54 includes data for the actor who won the Oscar, and column 56 includes data for the movie title for which the actor won the award.

At block 62, the structured data is analyzed. The data is analyzed using logical complexity 64a and/or linguistic variation 64b to determine which questions can be answered by the database.

With logical complexity 64a (database design), concepts (e.g., objects, statistics, etc) are designated. The objects include, for example, AWARD, PLAYER, and TIME.

Based on the extracted concepts, views are designed. As discussed above, the view is a table having several columns, organized according to the concepts.

Each of the columns may include an annotated question, which is answerable by data stored in the columns.

With linguistic variation (the language model) 64b, the data is analyzed to identify, for example, synonyms, domain words, stop phrases, and meaningless words. Using this information, parameterized questions can be identified, which can be annotated to the view.

At block 64 the columns 52, 54, 56 are tagged with questions answerable by the data based on the analysis at block 62. The questions may be parameterized questions. In addition, the answers corresponding to the answerable questions may be linked to the question and/or annotated to the table. The answers may also be parameterized answers.

It will be appreciated that the database need not include questions annotated thereto. In this case, as will be described hereinafter, questions may be answered using the designated concepts.

FIGS. 4a and 4b illustrate an exemplary table 70 (or view) created according to the methods of FIGS. 2 and 3. Table 70 includes data 72 organized into columns 74 and rows 76. One of the rows 76 includes header information 78 describing the content of each of the columns 74.

The table 70 is identifiable by the objects 80 contained therein. The objects 82 refer to concept (or content) of each column, and may be the same as the header information 78. The objects 80 may be used by the system to locate a table which can answer a received query.

One or more questions 82 may be annotated to each of the columns, representing questions that are answerable by the data in the column. One or more answers 84 corresponding to the annotated questions 82 may also be annotated to the table 70.

It will be appreciated that the database need not include questions annotated thereto. In this case, as will be described hereinafter, questions may be answered using the designated concepts.

Figure 5:
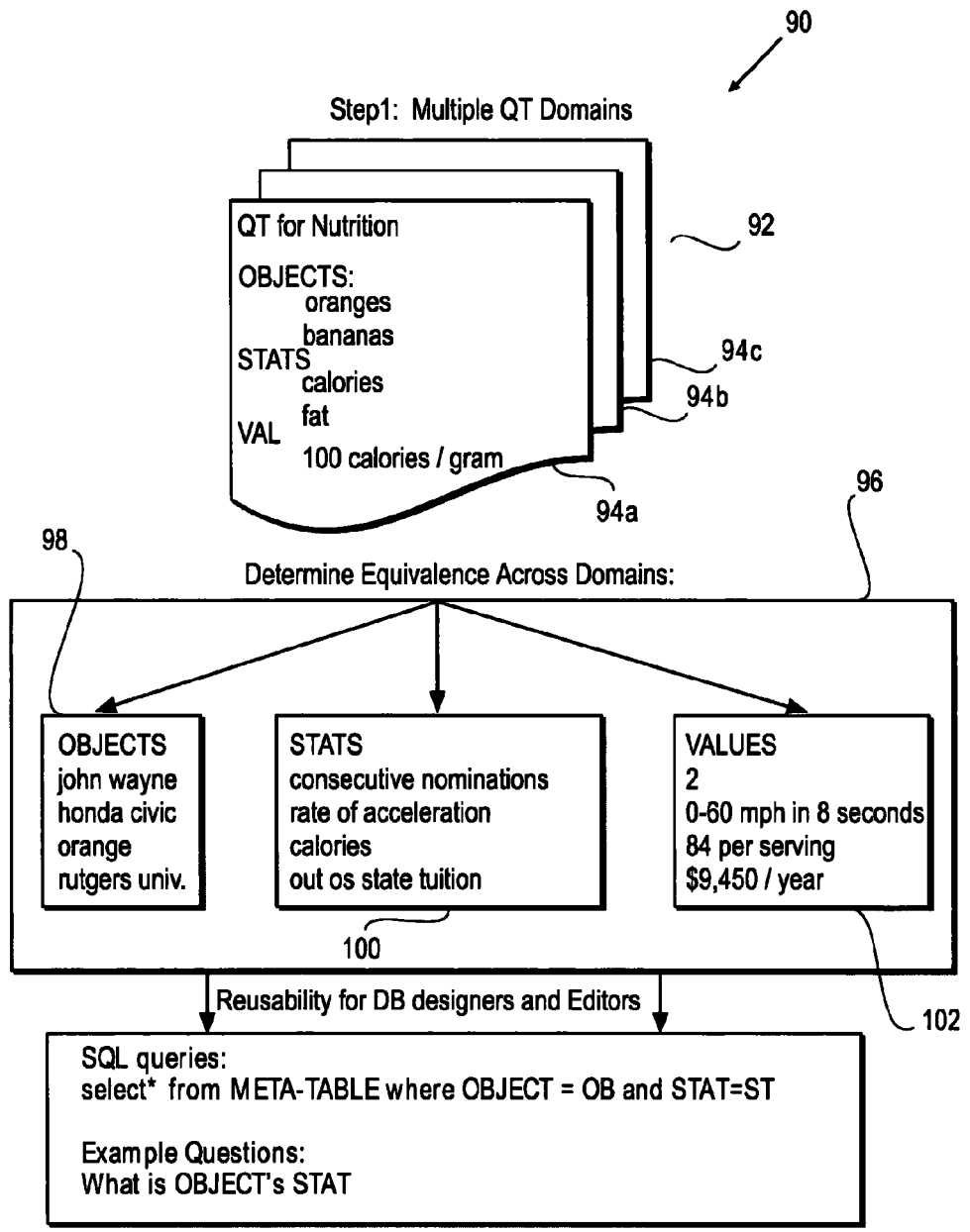
FIG. 5 is a process flow diagram showing a method for making a meta-table in accordance with one embodiment of the invention.

FIG. 5 illustrates a method for creating a database for answering questions using a meta-table 90. At block 92, multiple domains (94a, 94b and 94c) to be tagged with questions are identified. At block 96, the equivalence across the domains is determined. The equivalence is organized logically according to, for example, OBJECTS 98, STATS 100 and VALUES 102. At block 104, SQL queries which can be answered by the meta-table and answerable questions are annotated to the meta-table. Two exemplary meta-tables include: 1) OBJECT STAT VAL PRED and 2) OBJECT RANK STAT PRED.

The basic table for an entity can be modeled by a meta-table in which a tuple <x, y, u, v> captures the statement: the OBJECT x, has STAT y with VAL u in PRED v or OBJECT x, has RANK y with STAT u in PRED v. These meta-tables can store information for, for example, cars, foods and cities in the same table, tagging only four columns for all domains (four questions), rather than four columns for each domain (sixteen questions).

It will be appreciated that the database need not include questions annotated thereto. In this case, as will be described hereinafter, questions may be answered using the designated concepts.

Figure 6:
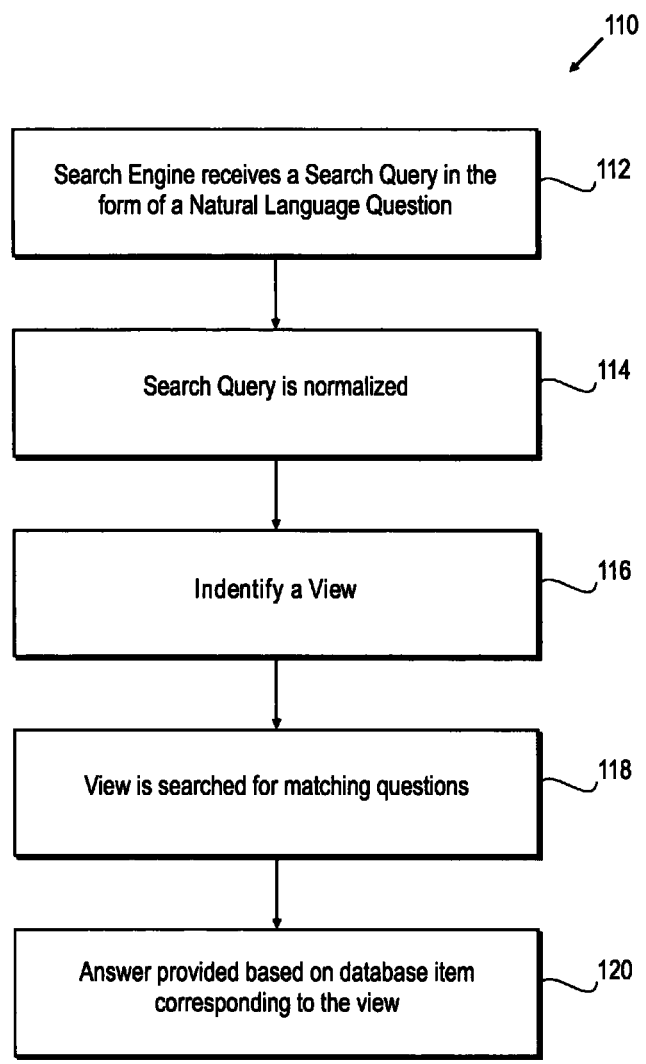
FIG. 6 is a process flow diagram showing a method for providing an answer to a search query using a table created according to the methods of FIGS. 2 and 3 in accordance with one embodiment of the invention.

FIG. 6 illustrates a method for answering a search query 110. At block 112, the search engine 22 receives a search query from a user. The search query may be in the form of a natural language question. At block 114, the search query is normalized. At block 116, the search query is used to identify a view that can answer the search query. At block 118, the view is analyzed to determine whether an annotated question matches the search query. At block 120, an answer is provided to the search engine based on the data in the view corresponding to the annotated question. The answer provided to the user who entered the search query may be a simple answer to the query and/or an answer with one or more hyperlinks to web sites related to the query.

Figure 7:
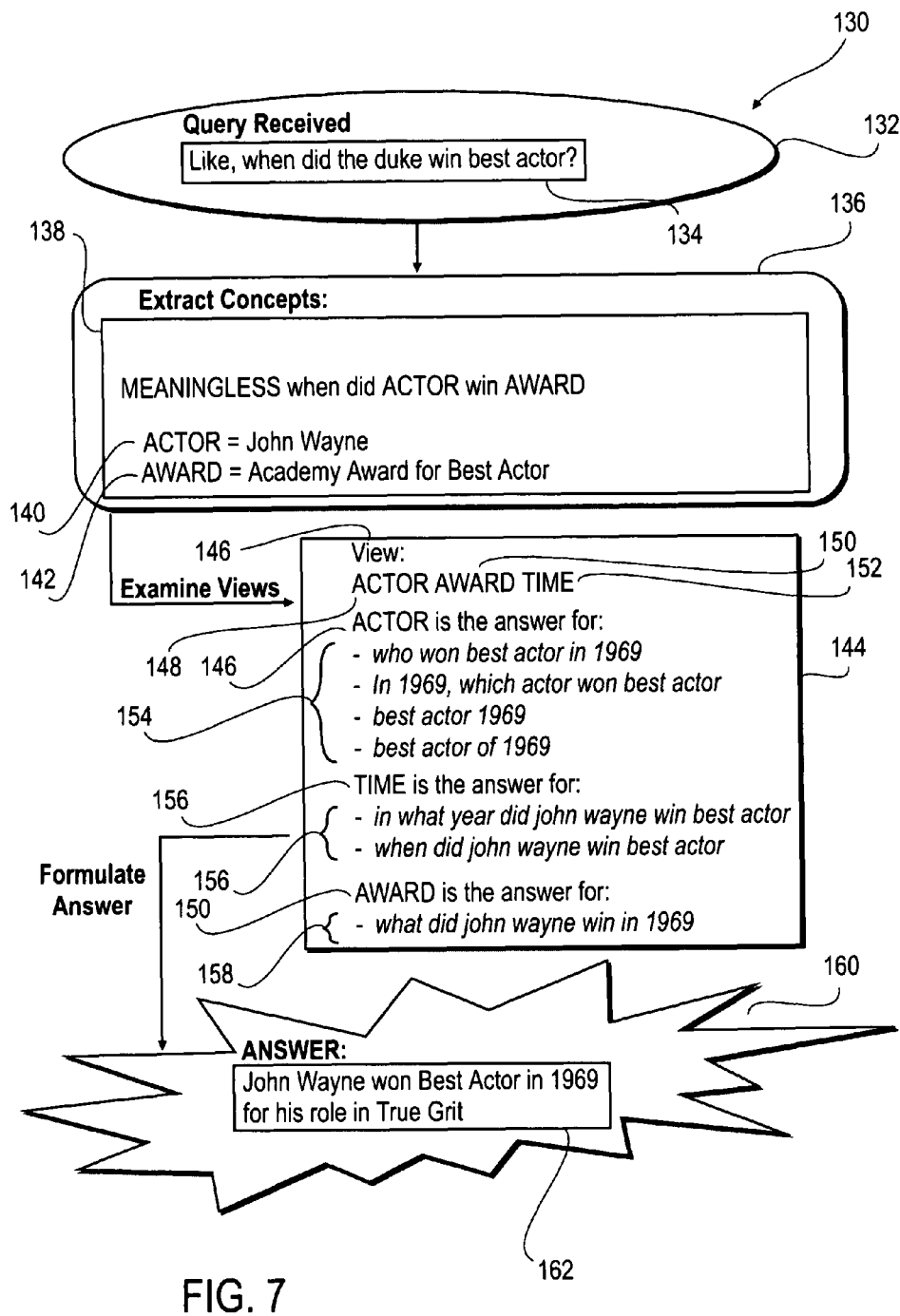
FIG. 7 is a process flow diagram showing a detailed method for providing an answer to a search query using a table created according to the methods of FIGS. 2 and 3 in accordance with one embodiment of the invention.

FIG. 7 illustrates a method for answering a search query 130.

At block 132, a query 134 is received. The illustrated query 134 is in the form of a natural language question. For example, the natural language question may be "Like, when did the duke win best actor?"

The query may be normalized. Normalization may include parsing the query for special words (e.g., car name, mileage, etc) that may identify key terms in the query and/or identifying synonyms for these words. Normalization may also include removing stop words, changing pluralities to singularities and the like.

At block 136, concepts are extracted from the query. The concepts are extracted by analyzing the query. The query may be converted into a parameterized query 138, in which certain search terms are replaced with parameters representing the concept of the search term. For example, the natural language question "Like, when did the duke win best actor" is equivalent to "MEANINGLESS when did ACTOR win AWARD?" Thus, a first concept 140 may be ACTOR, which in the example is John Wayne (i.e., the duke), and a second concept 142 is AWARD, which in the example is Academy Award for Best Actor.

At block 144, views are examined to determine which view can answer the search query. The views may be identified by concepts, which can be searched to determine whether a question corresponding to the query will be in the view. In the illustrated example, the view 146 corresponding to the search query 134 includes first, second and third concepts 148, 150 and 152, respectively, corresponding to ACTOR, AWARD and TIME, respectively.

Each of the concepts 148, 150 and 152 corresponds to a column in a database, such as the database illustrated in FIGS. 4a and 4b. The vector of extracted concepts is compared with the vectors corresponding to each of the classes (table columns). Projections and selections may be distinguished when the vectors are compared. Projections are attributes which are returned (i.e., it is projected on) and selections are attributes on which selection is made.

Each of the concepts or columns may have one or more questions annotated thereto. Thus, the first concept 146 is shown having a first set of questions 154 annotated thereto, the second concept 148 is shown having a second set of questions 156 annotated thereto, and the third concept 150 has a question 158 annotated thereto.

In the illustrated example, the set of questions 154 corresponding to the first concept 146, ACTOR, include, for example: Who won best actor in 1969; In 1969, which actor won best actor; best actor 1969; and best actor of 1969. In the illustrated example, the set of questions 156 corresponding to the third concept 152, TIME, include, for example: In what year did John Wayne win best actor; and, When did John Wayne win best actor. In the illustrated example, the question 158 corresponding to the second concept 150, AWARD, include, for example: What did John Wayne win in 1969.

The question can be mapped to the correct view and/or column with recognition of the table name and the projected column name. If the table name is not correctly recognized, the classifier can combine selection attributes and projection attributes to find a table which contains that set of column attributes. If there is conflict (i.e., more than one match), distance-based methods may be used to establish proximity. It will be appreciated that exact matching is not required to map the received query with the annotated question.

If a query is not matched properly or fails to match, a help tool may be activated which suggests a set of changes to the query, so that it may be properly classified. For example, if the query "what is the state with the highest population" is not correctly classified but the question "what is the state with the most population" is correctly classified, the system may offer conditional classification under condition that "most" and "highest" are equivalent. Thus, the vocabulary of the question answering system can be increased and previously unanswerable questions can become answered by rephrasing the questions into classified questions.

As an alternative to feature extraction, syntactic matching may be used to determine the answer to the received query. In syntactic matching, a question Q matches a tag Q,' if a substitution exists for the domain name (i.e., mapping from D to D), such that when the domains are mapped, Q is substituted with Q'. Other substitutions may be invoked if there exists, for example, a set of synonyms. Then, terms in Q may be replaced with synonyms. Conditional matching, in which the synonyms may be derived from question examples may be used to match the questions. That is, a question Q with the term t matches a question Q' with the term t', if the terms t and t' are synonyms. An editor for the system can confirm whether any synonym should or should not be used.

As an alternative to question mapping, concept matching may be used to determine the answer to the received query. It will be appreciated that the database need not include questions annotated thereto in embodiments using concept matching.

In concept matching, concepts of the received query are identified. A view having concepts corresponding to the query concepts is identified. The search query can be answered from the identified view using the data in the view corresponding to the identified concepts.

For example, if a received query is "How many triples did Sam Crawford hit," the identified concepts are PLA (corresponding to a player's name, e.g., Sam Crawford) and STAT (corresponding to a statistic, e.g., triples), and the query is searching for the VAL (value of the statistic for a player). The system then identifies a view having the concepts: PLA, STAT and VAL. The system then searches the view to determine the database item that answers the received query.

As a further alternative to question mapping, a statistical method may be used to determine the answer to a received query. The statistical method may be used to identify a view to answer a received query and/or to answer the received query. It will be appreciated that the database need not include questions annotated thereto in embodiments using statistical methods.

In the statistical method, the view and/or answer can be identified based on a priori probability that a certain meaning is true. The query and/or the concepts can be analyzed to determine the likelihood that a certain meaning is desired.

For example, if a received query is directed to "Michael Jordan," a view relating to Michael Jordan may be identified. However, the view may contain information relating to Michael Jordan's education, his basketball statistics and records, salary information, etc. Another view or the same view may also include information about the Michael Jordan restaurant.

Using statistical methods, it can be determined that 85% of queries are related to Michael Jordan as a basketball player, 10% of queries are related to Michael Jordan as a basketball team owner, and 5% of queries are related to the restaurant. Other tools may be used to determine this distribution, as well.

However, in the presence of certain words, there is a different probability distribution for the particular meanings. For example, if the search query includes "Michael Jordan" and "menu," the probability is much higher that the search query is related to the restaurant. Thus, the answer provided in response to the search query will be from the restaurant view or will be related to the restaurant concepts in the Michael Jordan view.

It will be appreciated that using the concept matching and statistical methods, questions need not be annotated to the view (or table). Other methods may be used to identify answers to questions using the views (or tables) without requiring the databases to include annotated questions or answers (i.e., tags).

As a still further alternative to question mapping, a string distance method may be used to determine the answer to a received query. In the string distance method, a query can be matched to a tag (e.g., annotated question) even though the query and tag do not match exactly. String distance methods are used to determine if the query is close enough to the tag according to a metric (or threshold) of string distance. Various string distance methods, such as, for example, Levenshtein edit distance, word vector similarity, cosine distance, Euclidean distance, Jaccard score, word vector distance, dice coefficient, and the like, can be use used to identify the similarity between a query and a tag.

For example, if a received query is "What is the menu in Michael Jordan's restaurant," but the annotated question is "What is the menu at Michael Jordan's restaurant," string distance methods can be used to determine whether the question and tag are sufficiently similar to answer the query.

At block 160, an answer 162 is formulated to the search query. The answer 162 may be determined using any of the above-described methods including, for example, exact question matching, inexact question matching and non-matching (e.g., answering questions merely with the structured data—without annotated questions).

The answer 162 may be a parameterized answer linked to the parameterized question matching the received query. Alternatively, the answer 162 may be a parameterized answer linked to a view (or table). The values (or database items) in the table corresponding to the received query are substituted into the parameterized answer.

In the illustrated example, the answer to the query 134, "Like, when did the duke win best actor" is "John Wayne won Best Actor in 1969 mfor his role in the move True Grit."

The systems and methods for answering questions disclosed herein essentially reduce question answering to a question classification problem. As discussed above, the question classes are identified with table columns. Once the question has been classified, the SQL query is generated. If there are several SQL queries for a given column (i.e., SQL queries differ by selection condition), then more information is extracted from the question to build the full selection condition.

The system is also desirably trained to not answer questions which it cannot answer. For example, if the databases for the system only include information for American cities, it is desirable that the system know not to provide an answer to a question asking about the population of London. The system may include a set of words which are neutral for a given name (i.e., words which can be ignored). Negative words (i.e. the presence of which cause the question to not be answered) do not need to be specifically included in the system, but may be included in a list. The negative words include words which are not included in the lists of concepts, domain constants and neutral words for a given domain.

The system may offer users the ability to rephrase their query if the system fails to obtain an answer to their question. When the user rephrases (how else can the question be answered), the previously unanswered questions can be mapped to an answerable question. The originally asked question can then be mapped to other equivalent annotated (answerable) questions and can be added to the appropriate view and column if the rephrasing is successful. This increases the number of tagging questions and improves the quality of the question answering. If rephrasing is not successful, the system can still form an equivalence class of questions, which can be added to a subsequently-created view.

The systems and methods described herein are advantageous because they are semantic, as opposed to purely syntactical. Using a semantical approach, by defining the scope of questions and annotating them to create a view, it is easy to understand the logic of the system and the information that can be provided using the system. That is, the systems and methods described herein allow a user and the provider to understand what kind of information can be answered by the system. Thus, the views capture the logical complexity and define the logical capacity of the question answering system. Further, by defining view concepts and subsequently matching the concepts, questions can also be answered without annotating questions to the views.

Meta-tables are advantageous because they provide a scalability aspect to the system. That is, one meta-table can be capable of representing all of the data.

Figure 8:
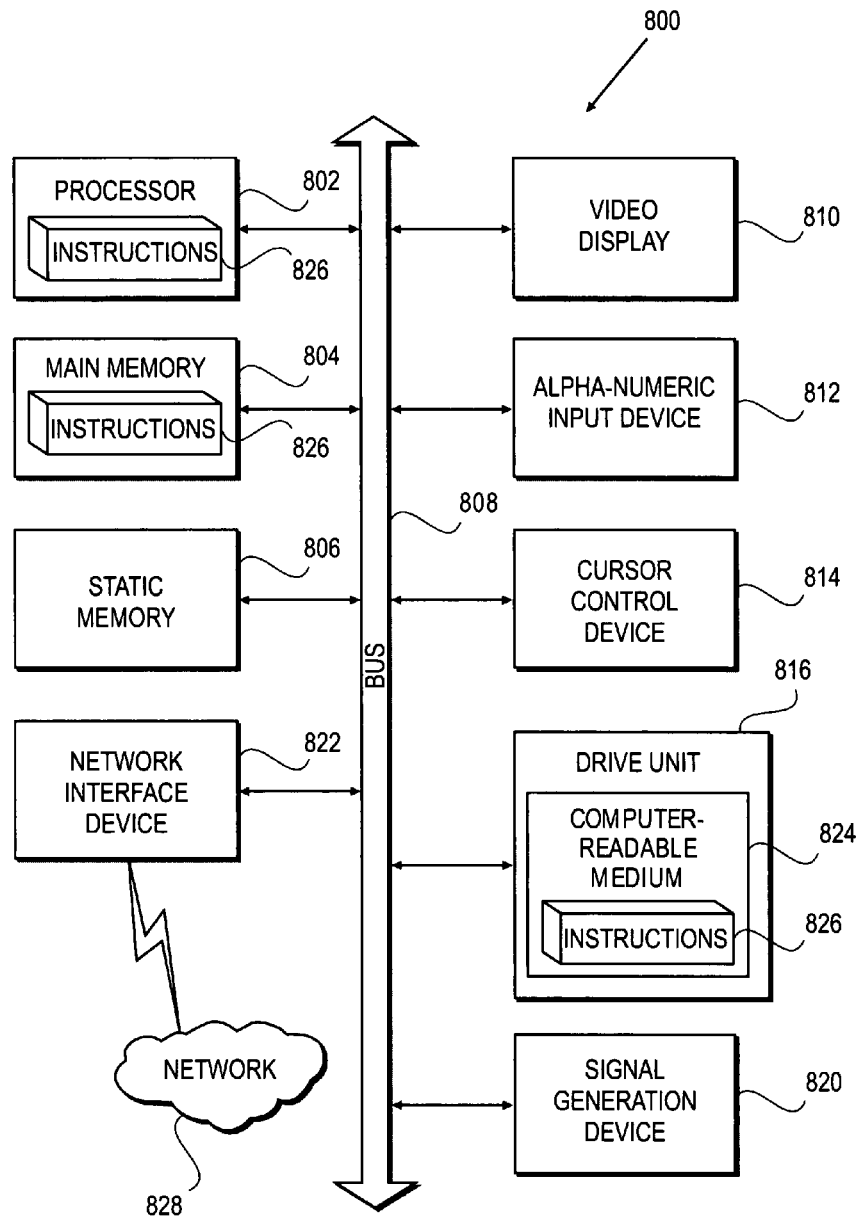
FIG. 8 is a block diagram of a computer system in accordance with one embodiment of the invention.

FIG. 8 shows a diagrammatic representation of machine in the exemplary form of a computer system 800 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processor 802 (e.g., a central processing unit (CPU), a graphics processing unit (GPU) or both), a main memory 804 (e.g., read only memory (ROM), flash memory, dynamic random access memory (DRAM) such as synchronous DRAM (SDRAM) or Rambus DRAM (RDRAM), etc.) and a static memory 806 (e.g., flash memory, static random access memory (SRAM), etc.), which communicate with each other via a bus 808.

The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 820 (e.g., a speaker) and a network interface device 822.

The disk drive unit 816 includes a machine-readable medium 824 on which is stored one or more sets of instructions (e.g., software 826) embodying any one or more of the methodologies or functions described herein. The software 826 may also reside, completely or at least partially, within the main memory 804 and/or within the processor 802 during execution thereof by the computer system 800, the main memory 804 and the processor 802 also constituting machine-readable media.

The software 826 may further be transmitted or received over a network 828 via the network interface device 822.

While the machine-readable medium 824 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The foregoing description with attached drawings is only illustrative of possible embodiments of the described method and should only be construed as such. Other persons of ordinary skill in the art will realize that many other specific embodiments are possible that fall within the scope and spirit of the present idea. The scope of the invention is indicated by the following claims rather than by the foregoing description. Any and all modifications which come within the meaning and range of equivalency of the following claims are to be considered within their scope.

What is claimed is:

1. A method for natural language searching comprising:
    receiving, by a processor, a search query in the form of a natural language question;
    normalizing, by the processor, the search query;
    searching, by the processor, a database to locate a question that matches the normalized search query, the database having a plurality of database items that are matched to the normalized search query and a question tagged to the database associated with the database items, wherein the question is a parameterized question having a plurality of parameters, the parameters replaceable by the database items;
    matching, by the processor, the question to a parameterized answer, the parameterized answer having a plurality of parameters corresponding to the plurality of parameters in the parameterized question, the parameters replaceable by the database items and the parameterized answer being matched to the parameterized question by replacing the parameters in the parameterized question with the database items; and
    providing, by the processor, an answer corresponding to the parameterized answer and the database items in response to the search query.

2. The method of claim 1, wherein the database items are arranged into a plurality of columns and each of the columns has a question tagged to the column.

3. The method of claim 2, wherein the question tagged to the column is a question answerable by the database items in the column.

4. The method of claim 1, wherein the search query and the tagged question are exact matches.

5. The method of claim 1, wherein the tagged question has the answer associated therewith.

6. The method of claim 1, wherein normalizing the search query comprises one or more selected from the group consisting of removing unnecessary words from the search query, rephrasing the question into an answerable question, identifying and replacing words with synonyms, and modifying pluralities into singularities.

7. The method of claim 1, wherein the search query is matched to the tagged question by:
    automatically, by the processor, extracting features from the search query;
    identifying, by the processor, a database to be searched from the features; and
    identifying, by the processor, a column with a tagged question from the features.

8. The method of claim 1, wherein the search query is matched to the tagged question by:
    automatically, by the processor, extracting features from the search query;
    mapping, by the processor, at least one of the features to a concept corresponding to the database; and
    mapping, by the processor, the question that needs to be answered to a matching tagged question.

9. The method of claim 1, further comprising identifying a database to search.

10. The method of claim 9, wherein identifying a database to search comprises comparing concepts extracted from the search query with concepts related to the database items in the database.

11. A natural language search system comprising:
    a processor;
    a computer readable medium connected to the processor; and a set of instructions on the computer readable medium that are executable by the processor, including:

a search engine to receive a search query in the form of a natural language question;

a database to store a plurality of database items that are matched to the search query organized into columns and a question annotated to each of the columns, the question being a parameterized question that is answerable by the database items in the column, the parameterized question having a plurality of parameters replaceable by the database items, and a parameterized answer annotated to each of the columns, the parameterized answer having a plurality of parameters corresponding to the plurality of parameters in the parameterized question, the parameters replaceable by the database items and the parameterized answer being matched to the parameterized question by replacing the parameters in the parameterized question with the database items; and a server to search the database for a question that matches the search query and provide an answer corresponding to the database item, parameterized question and parameterized answer to the search engine.

12. The system of claim 11, wherein the answer is a parameterized answer, and the server substitutes database items corresponding to the answer to the search query into the parameterized answer before the answer is provided to the search engine.

13. The system of claim 11, wherein the server is further to normalize the search query.

14. The system of claim 11, wherein the search query and annotated question are an exact match.

15. The system of claim 11, wherein the server is further to identify a database to search.

16. The system of claim 11, further comprising:

a question answering interface, in communication with the database, the question answering interface having a question answering algorithm that searches the database for an annotated question corresponding to a question that needs to be answered and answers the question that needs to be answered with the parameterized answer and the database items.

17. The system of claim 16, wherein the annotated question and the question that needs to be answered are an exact match.

18. The system of claim 16, wherein the question answering algorithm automatically extracts features from the question that needs to be answered, extracts a table name from the features, and extracts a parameterized question from the features.

19. The system of claim 16, wherein the question answering algorithm automatically extracts features from the search query, maps at least one of the features to a concept corresponding to the database; and maps the question that needs to be answered to a matching tagged question.

20. A non-transitory machine-readable storage medium that provides executable instructions which, when executed by a processor, cause the processor to perform a method for natural language searching comprising:

receiving, by a processor, a search query in the form of a natural language question;

normalizing, by the processor, the search query;

searching, by the processor, a database to locate a question that matches the normalized search query, the database having a plurality of database items that are matched to the normalized search query and a question tagged to the database associated with the database items, wherein the question is a parameterized question having a plurality of parameters, the parameters replaceable by the database items;

matching, by the processor, the question to a parameterized answer, the parameterized answer having a plurality of parameters corresponding to the plurality of parameters in the parameterized question, the parameters replaceable by the database items and the parameterized answer being matched to the parameterized question by replacing the parameters in the parameterized question with the database items; and providing, by the processor, an answer corresponding to the parameterized answer and the database items in response to the search query.

21. The machine-readable storage medium of claim 20, wherein the database items are arranged into a plurality of columns and each of the columns has a question tagged to the column.

22. The machine-readable storage medium of claim 21, wherein the question tagged to the column is a question answerable by the database items in the column.

23. The machine-readable storage medium of claim 20, wherein the search query and the tagged question are exact matches.

24. The machine-readable storage medium of claim 20, wherein the tagged question has the answer associated therewith.

25. The machine-readable storage medium of claim 20, wherein normalizing the search query comprises one or more selected from the group consisting of removing unnecessary words from the search query, rephrasing the question into an answerable question, identifying and replacing words with synonyms, and modifying pluralities into singularities.

26. The machine-readable storage medium of claim 20, wherein the search query is matched to the tagged question by:

automatically extracting features from the search query;

identifying a database to be searched from the features; and identifying a column with a tagged question from the features.

27. The machine-readable storage medium of claim 20, wherein the search query is matched to the tagged question by:

automatically extracting features from the search query;

mapping at least one of the features to a concept corresponding to the database; and mapping the question that needs to be answered to a matching tagged question.

28. The machine-readable storage medium of claim 20, wherein the method further comprises identifying a database to search.

29. The machine-readable storage medium of claim 28, wherein identifying a database to search comprises comparing concepts extracted from the search query with concepts related to the database items in the database.

* * * * *